United States Patent
Maehara et al.

(10) Patent No.: US 6,496,506 B1
(45) Date of Patent: Dec. 17, 2002

(54) ADDRESS FAULT MONITORING DEVICE AND ATM SWITCHING DEVICE

(75) Inventors: Akikazu Maehara, Fukuoka (JP); Naoyuki Yoshizumi, Kasuga (JP); Mitsuharu Wakayoshi, Fukuoka (JP); Akira Ohama, Fukuoka (JP); Hiroo Uchiyama, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/332,712

(22) Filed: Jun. 14, 1999

(30) Foreign Application Priority Data

Oct. 2, 1998 (JP) .......................................... 10-280710

(51) Int. Cl.[7] .............................................. H04L 12/28
(52) U.S. Cl. ...................................... 370/395; 370/242
(58) Field of Search ................................ 370/216, 242, 370/252, 389, 392, 395.1, 396, 397, 398, 399, 395.2, 395.7, 395.71, 395.72

(56) References Cited

U.S. PATENT DOCUMENTS 6,009,078 A * 12/1999 Sato ........................... 370/232
6,034,959 A * 3/2000 Mizukoshi et al. ........ 370/395

FOREIGN PATENT DOCUMENTS

| JP | 5-252183 | 9/1993 |
| JP | 7-288925 | 10/1995 |
| JP | 8-088636 | 4/1996 |

* cited by examiner

Primary Examiner—Wellington Chin
Assistant Examiner—Brenda Pham
(74) Attorney, Agent, or Firm—Katten, Muchin, Zavis & Rosenman (57) ABSTRACT

An address fault monitoring device and an ATM switching device capable of efficiently monitoring faults and quickly performing counter-fault process. Data storing unit stores data transmitted thereto. Write control unit controls the writing of data with respect to the data storing unit and notifies a read control side of write address information WD including information on a write address. Read control unit controls the reading of data with respect to the data storing unit and notifies the write control unit of read address information RD including information on a read address. Floating address measuring unit counts the number of floating addresses, and when a transmission error has occurred during transmission of the write address information WD or the read address information RD, it reckons the corresponding write or read address as a floating address. Fault notifying unit monitors the number of floating addresses to determine whether or not the number of floating addresses is greater than a preset threshold, and makes notification of fault if the number of floating addresses has become greater than or equal to the threshold.

10 Claims, 10 Drawing Sheets

ADDRESS FAULT MONITORING DEVICE AND ATM SWITCHING DEVICE

BACKGROUND OF THE INVENTION (1) Field of the Invention

The present invention relates to an address fault monitoring device and an ATM (Asynchronous Transfer Mode) switching device, and more particularly, to an address fault monitoring device for monitoring faults associated with the occurrence of floating addresses which are unusable addresses and an ATM switching device for performing a cell routing-switching process.

(2) Description of the Related Art

ATM is a communication technique developed for public networks to accomplish, within one network, multimedia communications of data, voice, moving picture, etc. at respective required rates while maintaining respective required qualities, and has been accepted as the foundation of next-generation information communications.

Material techniques for achieving ATM communications include cell switching technique. The cell switching technique is a technique of distributing asynchronously arriving cells at high speed according to their destinations, and is implemented by an ATM switching device having a hardware-based self routing-switching function.

Figure 10:
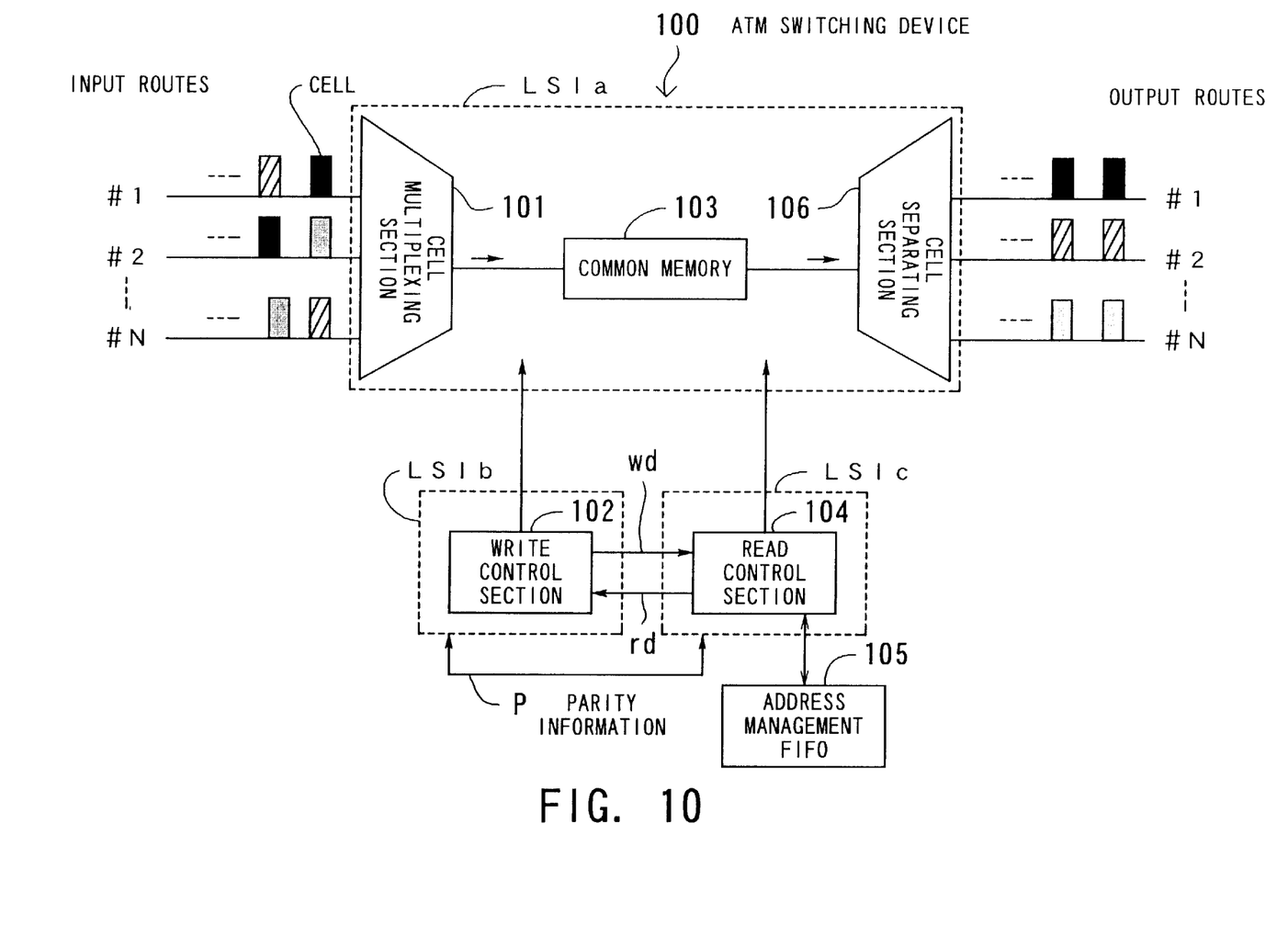
FIG. 10 is a diagram showing a schematic arrangement of a conventional ATM switching device.

FIG. 10 illustrates a schematic arrangement of a conventional ATM switching device. An ATM switching device 100 constitutes a common buffer-type ATM switched speech channel.

A cell multiplexing section 101 multiplexes cells transmitted thereto from input routes #1 to #N. A write control section 102 performs write control on cells arriving at a rate of V from the N input routes, to write the cells once into a common memory 103 at a rate of V×N.

A read control section 104 receives, from the write control section 102, write address information wd including information on addresses of the common memory 103 in which cells have been written, and stores the addresses in an address management FIFO 105 corresponding to output routes #1 to #N to which the cells are to be output.

In accordance with the addresses managed by the address management FIFO 105, the read control section 104 reads out the cells from the common memory 103.

In this case, read addresses of the common memory 103 are sent to the write control section 102 as read address information rd to be used for subsequent write operations.

A cell separating section 106 separates and outputs the cells read out from the common memory 103 according to their respective output routes.

The above components are constructed on respective integrated circuits. For example, the cell multiplexing section 101, the cell separating section 106 and the common memory 103 are constructed on LSIa, the write control section 102 is constructed on LSIb, and the read control section 104 is constructed on LSIc.

Accordingly, data is transmitted between the LSIs, and in order to ensure reliability of data transmission/reception, error correction needs to be made. In FIG. 10, error correction codes (parity information P) are exchanged between LSIb and LSIc.

If the read control section 104 detects a parity error while receiving the write address information wd, it does not read out the cell data then written into the common memory 103 at the corresponding address. An address like this which has ceased to be used due to transmission error or the like is called floating address.

Similarly, if the write control section 102 detects a parity error while receiving the read address information rd, the address (which becomes a floating address) then read out from the common memory 103 is not used thereafter as a write address.

Thus, if parity error occurs frequently, the number of floating addresses increases, reducing the storage area of the common memory 103.

Conventionally, therefore, a fault monitoring section is provided so that faults such as parity error or out-of-synchronism may be monitored by means of firmware.

However, with the conventional measures to cope with faults, those faults occurring at intervals shorter than the fault processing period of the firmware fail to be detected, and thus the number of occurrences of fault, if counted by the firmware, cannot be detected with accuracy.

Accordingly, if the firmware counts only one occurrence of fault though a plurality of floating addresses have occurred, a large number of floating addresses can possibly be created.

Seemingly, therefore, the maximum band of the overall system gradually narrows, giving rise to a problem that the common memory 103 overflows.

SUMMARY OF THE INVENTION

A first object of the present invention is to provide an address fault monitoring device capable of efficiently monitoring faults and quickly performing a counter-fault process.

A second object of the present invention is to provide an ATM switching device capable of efficiently monitoring faults and quickly performing a counter-fault process.

To achieve the first object, there is provided an address fault monitoring device for monitoring faults associated with occurrence of floating addresses which are unusable addresses. The address fault monitoring device comprises data storing means for storing data transmitted thereto, write control means for controlling writing of the data with respect to the data storing means and notifying a read control side of write address information including information on a write address, read control means for controlling reading of the data with respect to the data storing means and notifying the write control means of read address information including information on a read address, floating address measuring means for counting the number of the floating addresses by means of hardware, the floating address measuring means reckoning the write address or the read address as the floating address if transmission error occurs during transmission of the write address information or the read address information, and fault notifying means for monitoring the counted number of the floating addresses to determine whether or not the counted number is greater than a preset threshold, and making notification of fault if the counted number has become greater than or equal to the preset threshold.

To achieve the second object of the present invention, there is provided an ATM switching device for performing cell routing-switching process. The ATM switching device comprises a cell buffer for storing a cell transmitted thereto, write control means for controlling writing of the cell with respect to the cell buffer and notifying a read control side of write address information including information on a write address, read control means for controlling reading of the cell with respect to the cell buffer and notifying the write control means of read address information including information on a read address, floating address measuring means for counting the number of floating addresses, which are unusable addresses, by means of hardware, the floating address measuring means reckoning the write address or the read address as the floating address if transmission error occurs during transmission of the write address information or the read address information, and fault notifying means for monitoring the counted number of the floating addresses to determine whether or not the counted number is greater than a preset threshold, and making notification of fault if the counted number has become greater than or equal to the preset threshold.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
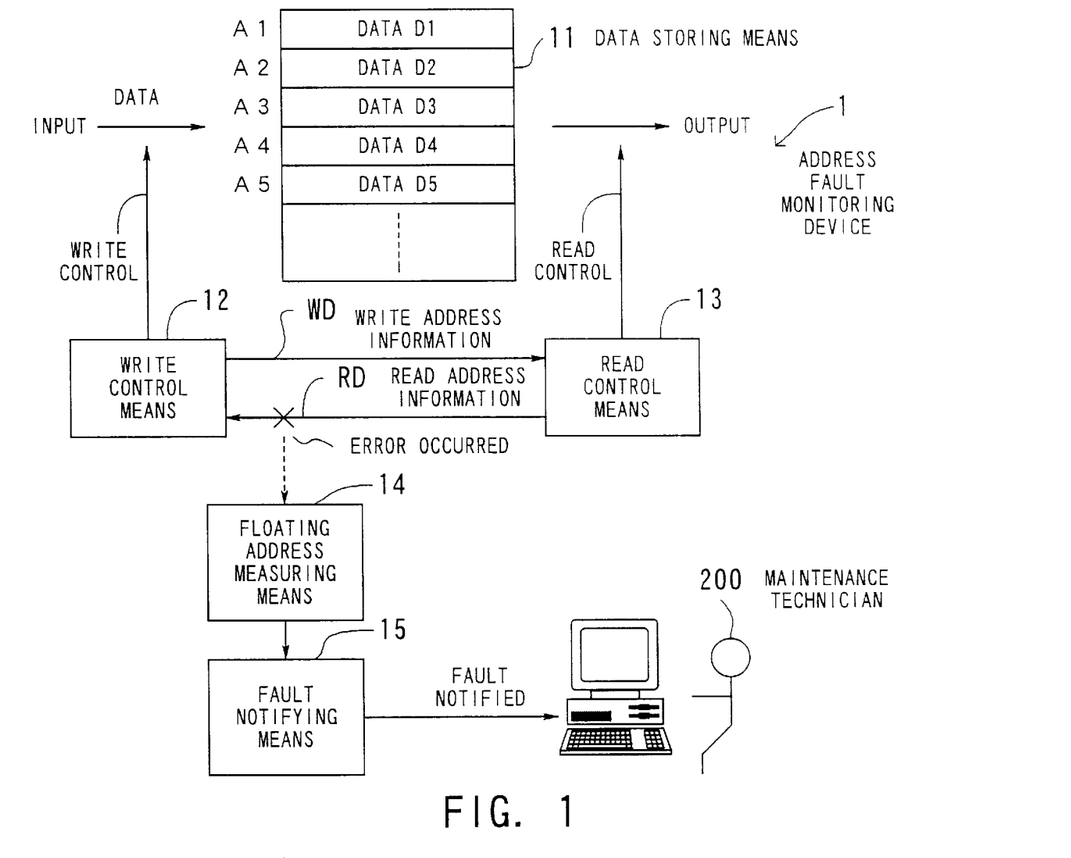
FIG. 1 is a diagram illustrating the principle of an address fault monitoring device according to the present invention.

Embodiments of the present invention will be hereinafter described with reference to the drawings. FIG. 1 illustrates the principle of an address fault monitoring device according to the present invention.

An address fault monitoring device 1 monitors faults associated with the occurrence of floating addresses which are unusable addresses.

Data storing means 11 stores data transmitted thereto. Write control means 12 controls the writing of data with respect to the data storing means 11 and notifies read control means 13 of write address information WD including information on write addresses.

The read control means 13 controls the reading of data with respect to the data storing means 11 and notifies the write control means 12 of read address information RD including information on read addresses.

As the read address information RD is received from the read control means 13, the write control means 12 can determine which addresses to write next (i.e., available addresses of the data storing means 11).

Also, since the write address information WD is received from the write control means 12, the read control means 13 can determine which addresses to read (i.e., addresses of the data storing means 11 where data has been written).

The write control means 12 and the read control means 13 are constructed on separate LSIs.

Accordingly, the write address information WD and the read address information RD are exchanged by means of data transmission between the LSIs, and frame transmission (fixed period) is carried out for the purpose.

The write address information WD and the read address information RD therefore include a frame pulse and an error correction code (parity information).

Floating address measuring means 14 counts the number of floating addresses by means of hardware, and when transmission error (parity error) has occurred during transmission of the write address information WD or the read address information RD, it judges that the corresponding write or read address has become a floating address. In practice, parity error is detected to count the number of floating addresses.

Fault notifying means 15 monitors the counted number of floating addresses to determine whether or not the counted number is greater than a preset threshold, and if the former has become greater than or equal to the latter, it notifies an upper-level control section, a maintenance technician 200, etc. of the occurrence of fault. The threshold is set as desired by the user.

The floating address measuring means 14 and the fault notifying means 15 are included in at least one of the write control means 12 and the read control means 13.

Figure 2:
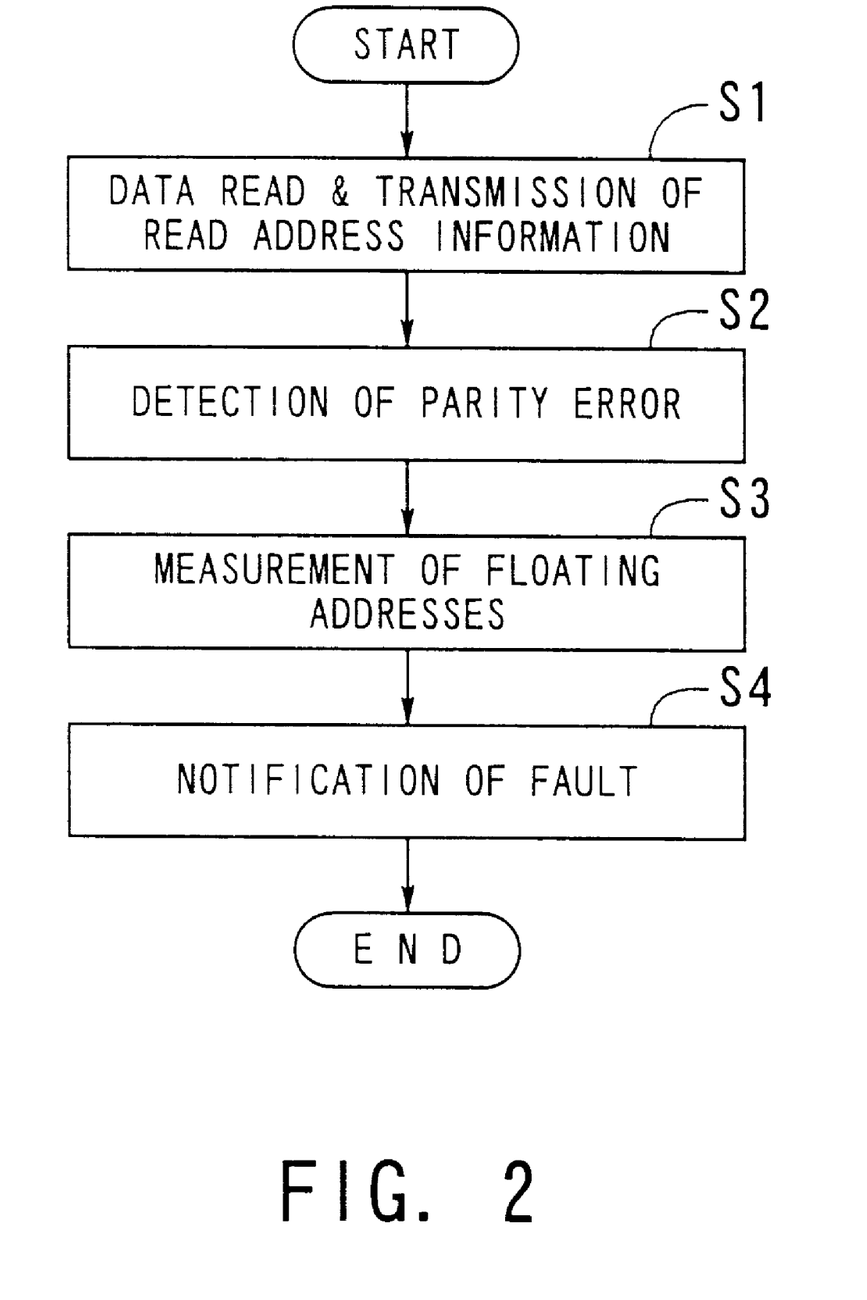
FIG. 2 is a flowchart showing an operation procedure of the address fault monitoring device in case of fault.

A fault operation performed upon occurrence of a floating address (in the following, the operation performed upon occurrence of a parity error in the read address information RD) will be now described. FIG. 2 is a flowchart showing an operation procedure of the address fault monitoring device 1 in case of fault.

[S1] The read control means 13 reads out data stored in the data storing means 11 and provides notification of the read operation by means of the read address information RD. For example, data D5 at address A5 shown in FIG. 1 is read out.

[S2] The write control means 12 detects a parity error during reception of the read address information RD, and in this case, it does not use the address A5 in subsequent data write operations. Namely, the address A5 becomes a floating address which is not used any longer in the subsequent process.

[S3] The floating address measuring means 14 counts the number of floating addresses (parity errors).

[S4] The fault notifying means 15 monitors the counted number of parity errors to determine whether or not the counted number is greater than the preset threshold.

Where the data storing means 11 has 1000 storage areas and the set threshold is "500", if the counted number of parity errors becomes equal to the threshold, then it means that half of the storage areas of the data storing means 11 are unusable.

It is therefore highly possible that reduction of the communication band or overflow will be caused, and thus notification of fault is made if the number of parity errors has become greater than or equal to the threshold.

Figure 3:
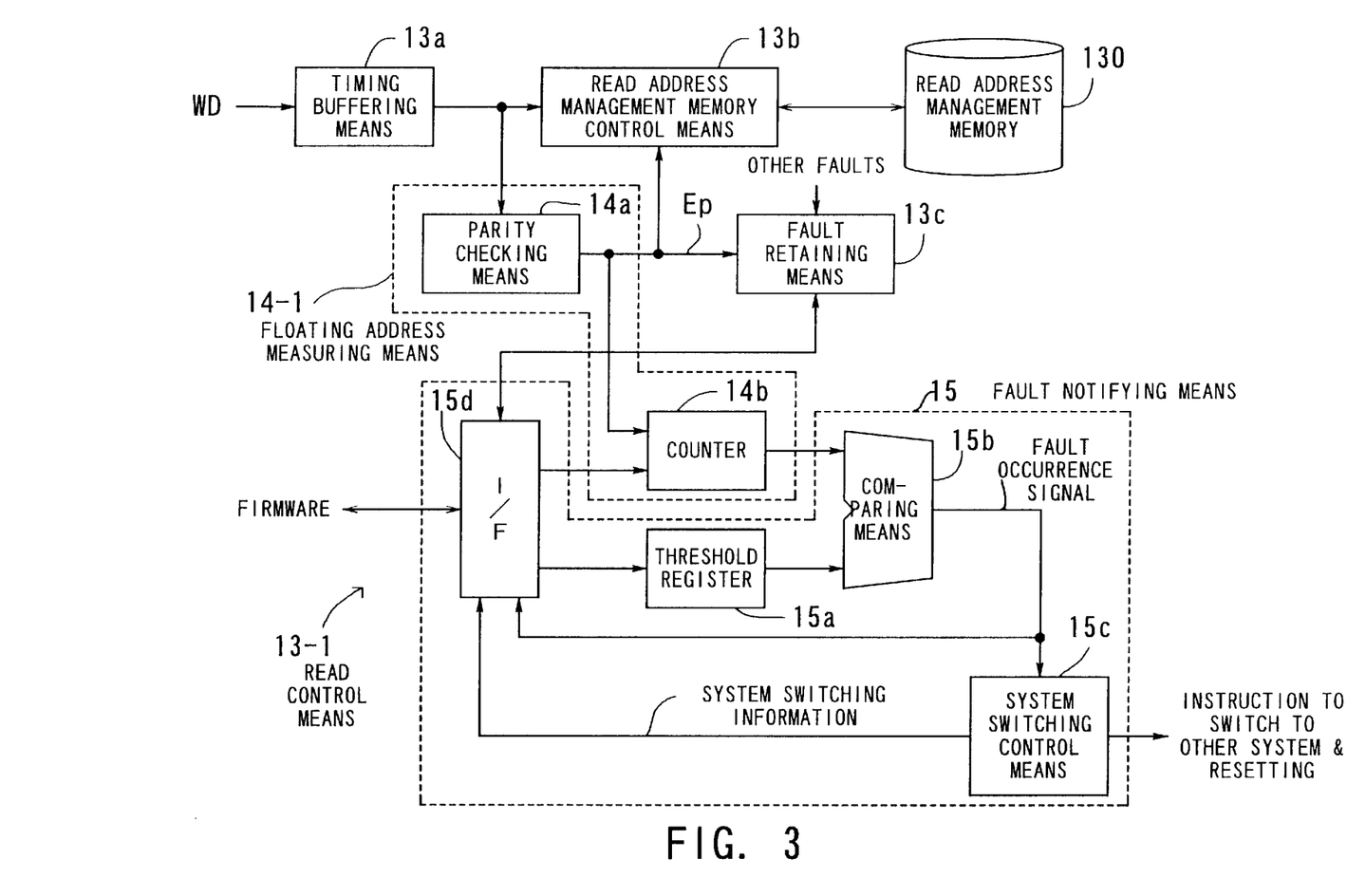
FIG. 3 is a diagram showing an arrangement according to a first embodiment.

An arrangement according to a first embodiment wherein the floating address measuring means 14 and the fault notifying means 15 are included in the read control means 13 will be described.

FIG. 3 illustrates the arrangement according to the first embodiment. In the figure, an interface section between the data storing means 11 and read control means 13-1 is omitted.

Timing buffering means 13a receives the write address information WD which is timed to the clock on the side of the write control means 12, and outputs the information in a manner timed to the clock on the side of the read control means 13-1.

Read address management memory control means 13b acquires, from the write address information WD, address information of the data storing means 11 in which corresponding data has been written, and stores the address information in a read address management memory 130 (provided externally to the read control means 13-1).

When the data is read from the data storing means 11, the address information is fetched from the read address management memory 130.

Floating address measuring means 14-1 comprises parity checking means 14a and a counter 14b.

The parity checking means 14a checks parity of parity information in the write address information WD output from the timing buffering means 13a.

The result of parity check is sent to the read address management memory control means 13b, fault retaining means 13c described later, and the counter 14b.

If the result of parity check shows error (if parity error signal Ep is received), the read address management memory control means 13b does not write the address information into the read address management memory 130.

The counter 14b counts parity errors based on the parity error signal Ep supplied thereto, to measure the number of floating addresses.

The fault retaining means 13c, which is a component conventionally known, retains parity error or other hardware fault and sets a fault flag when such a fault has occurred even once.

The fault notifying means 15 comprises a threshold register 15a, comparing means 15b, system switching control means 15c, and interface processing means (hereinafter referred to as I/F) 15d.

In the threshold register 15a is set the number of floating addresses, on detection of which notification of fault is to be made. The comparing means 15b compares the count of floating addresses held by the counter 14b with the threshold, and outputs a fault occurrence signal when the count has become greater than or equal to the threshold.

On receiving the fault occurrence signal, the system switching control means 15c performs switchover from the current operating system to a standby system. Also, the system switching control means 15c initializes (resets) the data storing means 11 by means of initializing means (not shown) incorporated therein.

The I/F 15d controls interfacing with firmware connected to an upper-level system. For example, the I/F 15d scans the fault flag of the fault retaining means 13c at regular intervals, and resets the flag after scanning.

Also, the resetting of the counter 14b and the threshold setting of the threshold register 15a are performed via the I/F 15d. Further, the I/F 15d notifies, on receiving the fault occurrence signal from the comparing means 15b, the upper-level system that the number of floating addresses has exceeded the threshold, and also relays system switching information from the system switching control means 15c to the upper-level system.

As described above, according to the first embodiment of the present invention, the number of parity errors is counted by the counter 14b, and when the number of floating addresses has become greater than or equal to the threshold, notification of fault is made and also system switching and initialization of the data storing means 11 are performed as a fault process.

Accordingly, the number of times a floating address has occurred can be detected with accuracy and a counter-fault process can be performed quickly.

Figure 4:
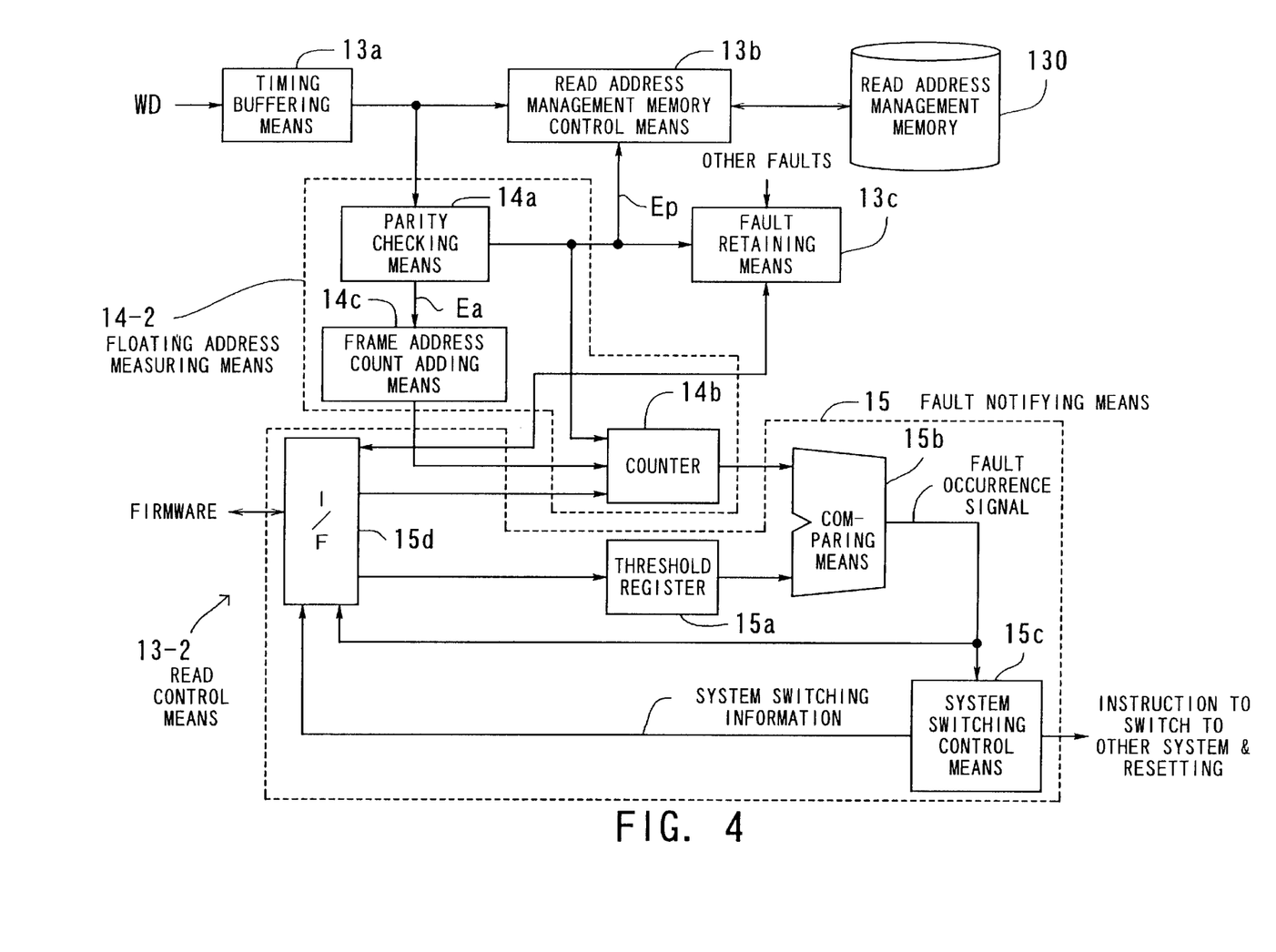
FIG. 4 is a diagram showing an arrangement according to a second embodiment.

An arrangement according to a second embodiment wherein the floating address measuring means 14 and the fault notifying means 15 are included in the read control means 13 will be now described.

In the second embodiment, when a transmission error has occurred in a frame pulse during transmission of the write address information WD, all addresses within a frame are counted as floating addresses.

FIG. 4 illustrates the arrangement according to the second embodiment. In the figure, an interface section between the data storing means 11 and read control means 13-2 is omitted; also, identical reference numerals are used to denote components identical with those appearing in FIG. 3 and description of such components is omitted.

Floating address measuring means 14-2 includes frame address count adding means 14c, in addition to the parity checking means 14a and the counter 14b.

The parity checking means 14a performs parity check, and if a parity error occurs, it outputs the parity error signal Ep explained above with reference to FIG. 3. Also, on detecting a parity error in a frame pulse of the write address information WD, the parity checking means 14a outputs an error enable signal Ea.

Namely, when a parity error is detected in a frame pulse, the parity checking means 14a judges that all addresses within the frame concerned are invalid, and outputs the error enable signal Ea notifying the occurrence of fault.

On receiving the error enable signal Ea, the frame address count adding means 14c reckons all addresses within the frame as floating addresses and sends the number of these addresses to the counter 14b.

For example, where there are 128 addresses in one frame, the counter 14b is notified of these 128 addresses at a time.

The counter 14b counts the number of parity errors detected by the parity checking means 14a and notified by means of the parity error signal Ep, as well as the number of addresses within one frame output from the frame address count adding means 14c, to thereby measure the number of floating addresses.

Alternatively, the frame address count adding means 14c may be designed to be supplied with the parity error signal Ep and to add up the number of addresses within one frame and the number of parity errors notified by means of the parity error signal Ep so that the result of addition may be sent to the counter 14b.

As described above, according to the second embodiment of the present invention, when a parity error has occurred in a frame pulse, all addresses within the frame concerned are counted as floating addresses. This permits accurate and efficient detection of the number of times floating address has occurred.

Figure 5:
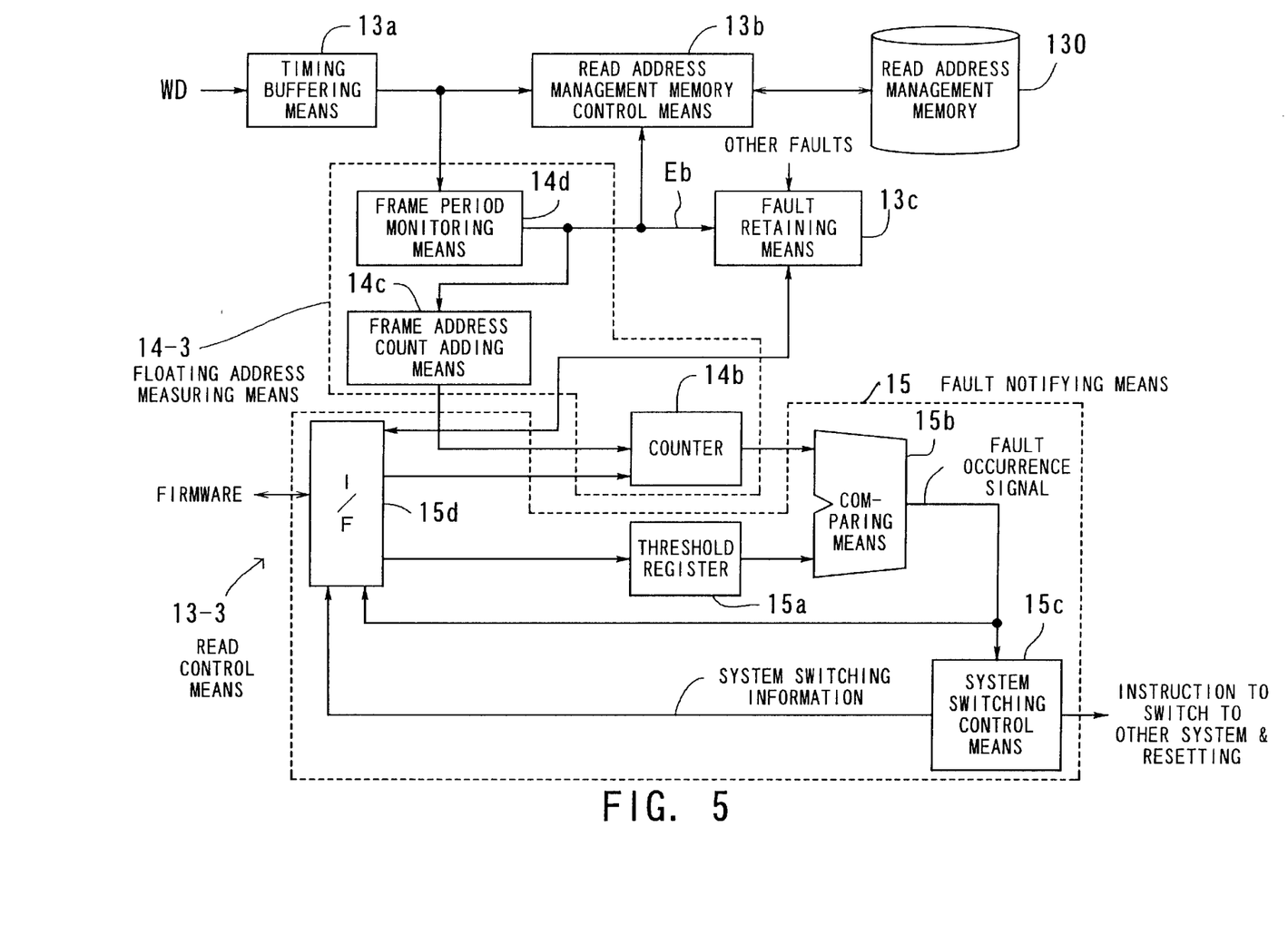
FIG. 5 is a diagram showing an arrangement according to a third embodiment.

An arrangement according to a third embodiment wherein the floating address measuring means 14 and the fault notifying means 15 are included in the read control means 13 will be now described.

In the third embodiment, when abnormality has occurred in the frame period during transmission of the write address information WD, all addresses within one frame are counted as floating addresses.

FIG. 5 illustrates the arrangement according to the third embodiment. In the figure, an interface section between the data storing means 11 and read control means 13-3 is omitted; also, identical reference numerals are used to denote components identical with those appearing in FIG. 4 and description of such components is omitted.

Floating address measuring means 14-3 comprises, in addition to the counter 14b and the frame address count adding means 14c, frame period monitoring means 14d in place of the parity checking means 14a.

The frame period monitoring means 14d monitors the frame period (fixed period) of the write address information WD, and upon detecting abnormality in the frame period such as phase shift, it outputs an error enable signal Eb.

Namely, when abnormality in the frame period has been detected, the frame period monitoring means 14d judges that all addresses within the frame concerned are invalid, and outputs the error enable signal Eb notifying the occurrence of abnormality.

Also, when the error enable signal Eb has been received, the read address management memory control means 13b does not write the address information into the read address management memory 130.

Further, when the error enable signal Eb has been received or some other fault has occurred, the fault retaining means 13c sets the fault flag.

On receiving the error enable signal Eb, the frame address count adding means 14c reckons all addresses within one frame as floating addresses and sends the number of the addresses to the counter 14b.

The counter 14b counts the number of addresses within one frame output from the frame address count adding means 14c, to measure the number of floating addresses.

Although in the above description the number of addresses within one frame is counted upon detection of abnormality in the frame period, the number of times abnormality has occurred in the frame period may alternatively be counted for the detection of fault.

In this case, the frame address count adding means 14c is unnecessary and the error enable signal Eb may be input to the counter 14b.

As described above, according to the third embodiment, when abnormality has occurred in the frame period, all addresses within one frame are counted as floating addresses. This permits accurate and efficient detection of the number of times floating address has occurred.

In the foregoing description of the first to third embodiments, the floating address measuring means 14 and the fault notifying means 15 are included in the read control means 13, but may alternatively be included in the write control means 12.

Figure 6:
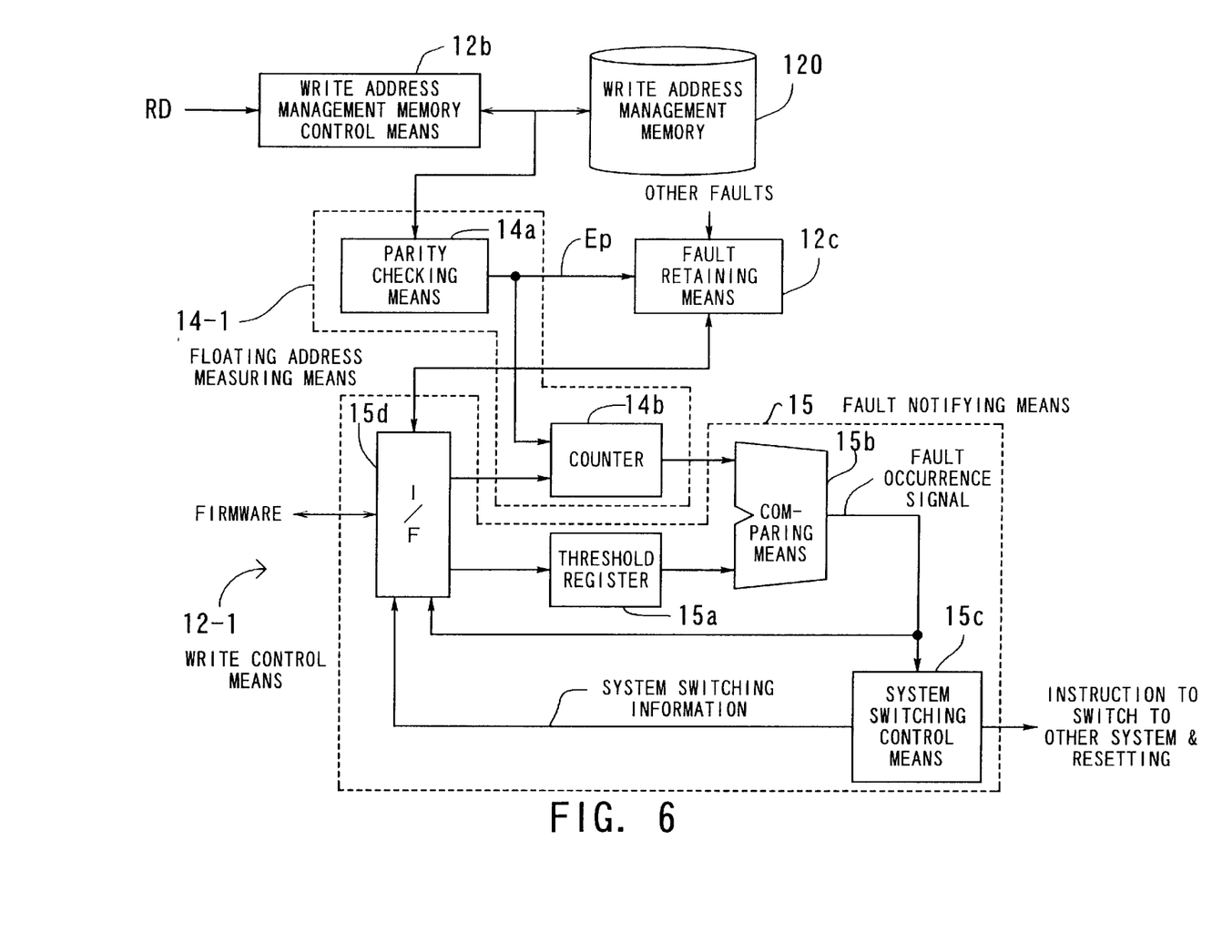
FIG. 6 is a diagram showing an arrangement according to a fourth embodiment.

An arrangement according to a fourth embodiment wherein the floating address measuring means 14 and the fault notifying means 15 are included in the write control means 12 will be now described.

In the fourth embodiment, floating addresses are counted based on error in transmission between write address management memory control means and write address management memory.

FIG. 6 illustrates the arrangement according to the fourth embodiment. In the figure, an interface section between the data storing means 11 and write control means 12-1 is omitted.

Write address management memory control means 12b obtains, from the read address information RD, the contents of address information of the data storing means 11 from which data has been read out, and stores the address information in a write address management memory 120 (provided externally to the write control means 12-1).

When writing data into the data storing means 11, the write address management memory control means 12b acquires the address information from the write address management memory 120.

Floating address measuring means 14-1 comprises parity checking means 14a and a counter 14b.

The parity checking means 14a checks parity of the address information read from the write address management memory 120.

The result of parity check is sent to fault retaining means 12c and the counter 14b.

The counter 14b counts parity errors based on the parity error signal Ep supplied thereto, to measure the number of floating addresses. Operations of the other components are identical with those described above, and therefore, description thereof is omitted.

As described above, according to the fourth embodiment of the present invention, floating addresses are counted based on parity error between the write control means 12 and the write address management memory 120. This permits accurate and efficient detection of the number of times floating address has occurred.

In the above description of the fourth embodiment, the floating address measuring means 14 and the fault notifying means 15 are included in the write control means 12, but may alternatively be included in the read control means 13.

In this case, floating addresses are counted based on transmission error occurring between the read address management memory control means 13b and the read address management memory 130.

Figure 7:
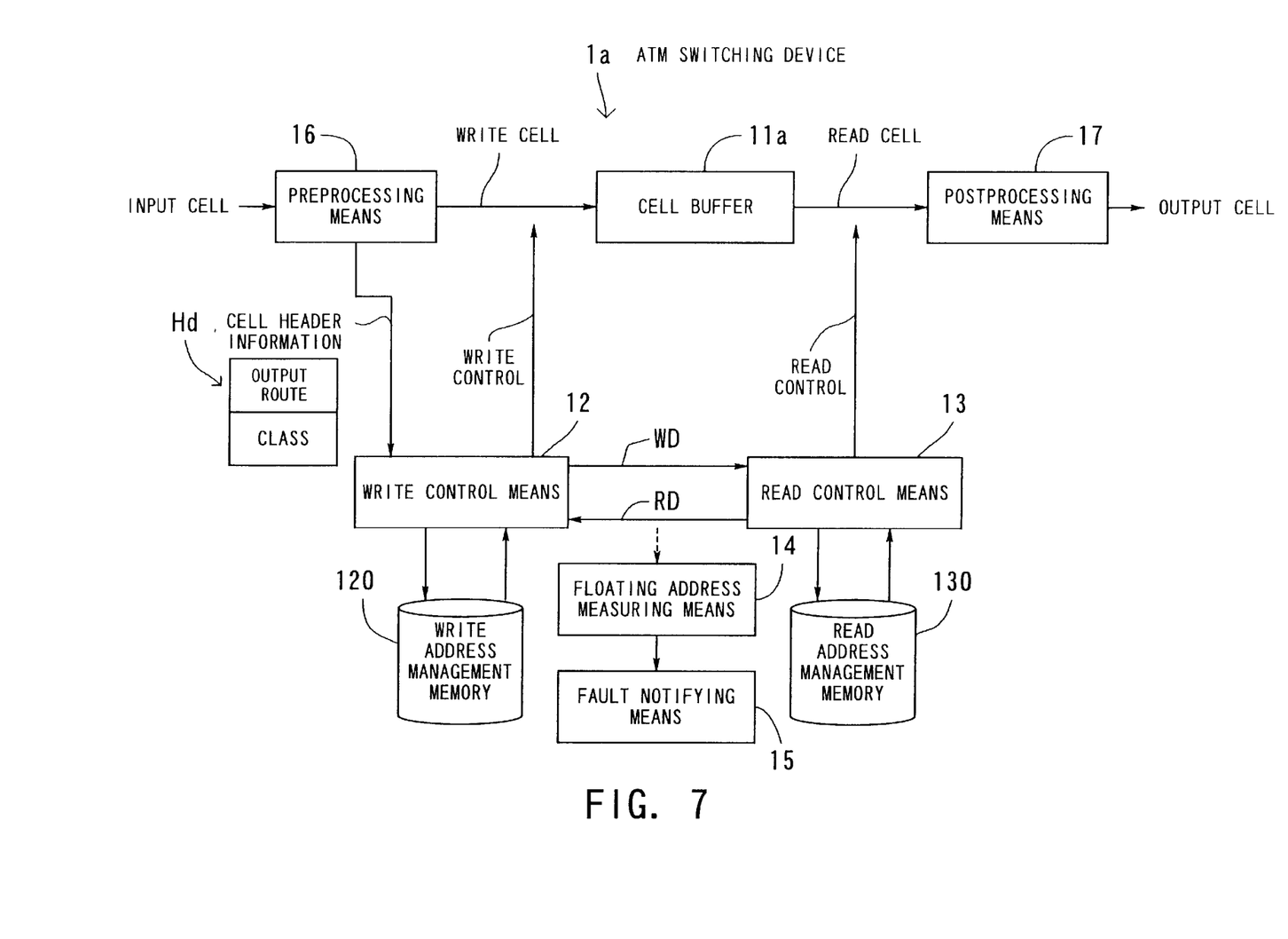
FIG. 7 is a diagram showing the arrangement of an ATM switching device.

An ATM switching device according to the present invention will be now described. FIG. 7 illustrates the arrangement of the ATM switching device.

An ATM switching device 1a performs a cell routing-switching process, and also performs fault monitoring and fault processing in case of the occurrence of floating address. The arrangement of the device is basically identical with that of the address fault monitoring device 1 shown in FIG. 1; therefore, identical reference numerals are used to represent identical components and description of such components is omitted.

Preprocessing means 16 multiplexes input cells transmitted thereto from individual input routes and separates cell header information Hd therefrom. The cell header information Hd, in which are described the output route and class, described later, of the cell concerned, is sent to the write control means 12 and used in the subsequent routing-switching process (read process).

A cell buffer 11a corresponds to the data storing means 11 and stores cells. Postprocessing means 17 separates and outputs cells according to their respective output routes.

Figure 8:
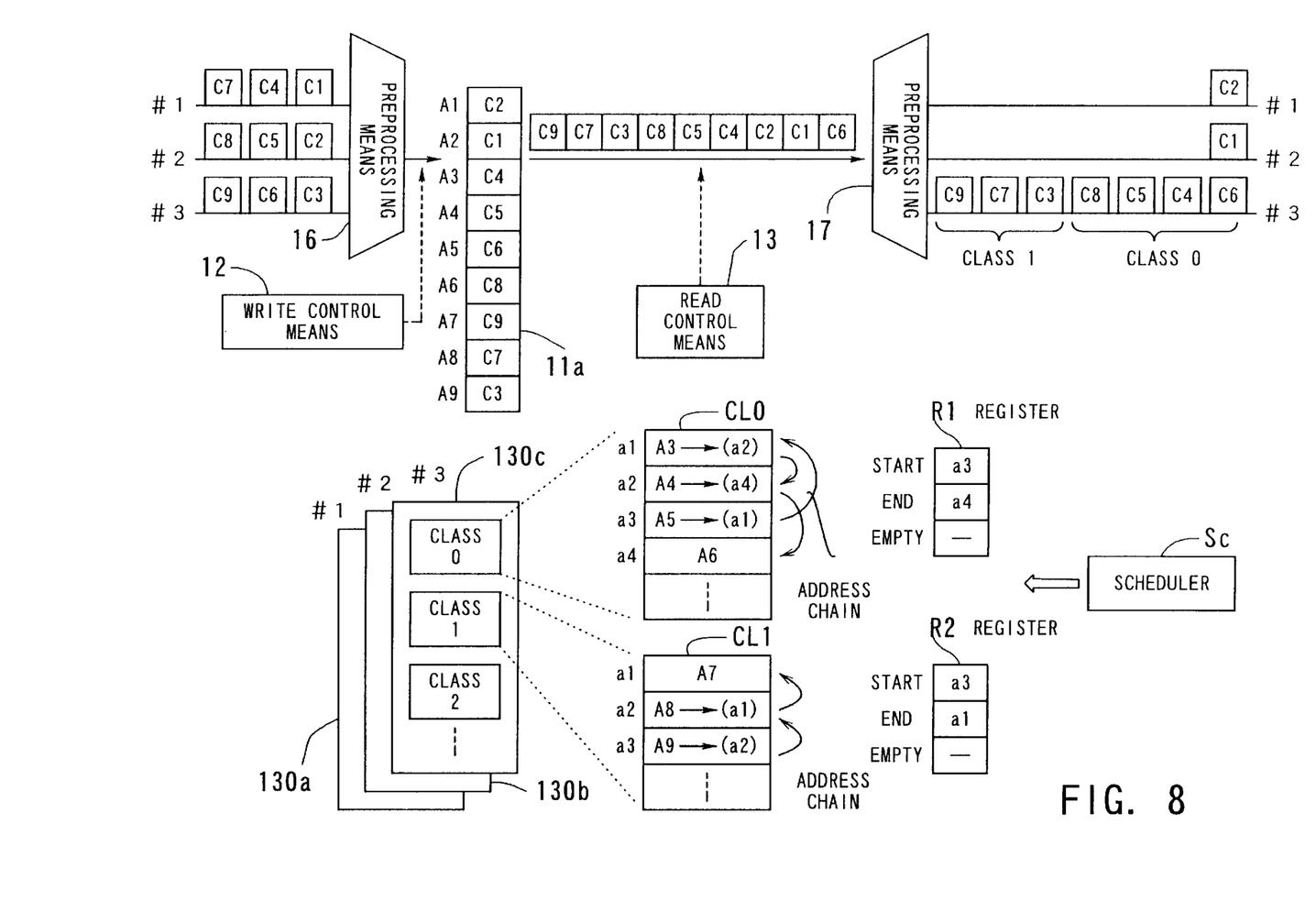
FIG. 8 is a diagram illustrating cell switching operation performed in the ATM switching device.

FIG. 8 illustrates cell switching operation performed in the ATM switching device 1a. Each cell is assigned a class indicative of its significance, and in the following, it is assumed that a smaller class number indicates greater significance.

Cells C1, C4 and C7 are transferred via input route #1, cells C2, C5 and C8 are transferred via input route #2, and cells C3, C6 and C9 are transferred via input route #3.

The write control means 12 writes the cells C2, C1, C4, C5, C6, C8, C9, C7 and C3 respectively at addresses A1, A2, A3, A4, A5, A6, A7, A8 and A9 of the cell buffer 11a.

The read control means 13 stores, in read address management memories 130a to 130c associated with output routes #1 to #3, respectively, the addresses of the cell buffer 11a in which the cells C have been written, according to classes.

It is here assumed that the cell C2 is output to the output route #1, that the cell C1 is output to the output route #2, and that the cells C6, C4, C5, C8, C3, C7 and C9 are output to the output route #3 in the order mentioned.

Also, it is assumed that the cells C6, C4, C5 and C8 are assigned class 0 and that the cells C3, C7 and C9 are assigned class 1 (classes of the cells C1 and C2 are not particularly specified because the following description is focused on the output via the output route #3).

The addresses A3, A4, A5 and A6 are stored in a class-0 storage area CL0 of the read address management memory 130c associated with the output route #3, in order of addresses a1 to a4 (addresses of the storage area CL0).

Since read operation needs to be carried out in order of addresses a3, a1, a2 and a4 (i.e., in order of cells C6, C4, C5 and C8), the addresses A are stored with addresses a to be read next affixed thereto.

For example, the address A5 is stored at the address a3 with the address a1 affixed thereto, the address a1 being the address where the address A3 to be read next is stored.

Thus, an address chain is created for each class and is managed by a register R.

In a register R1 shown in FIG. 8, for example, the address a3 is set as START (read start address) and the address a4 is set as END (read end address). EMPTY is flag information indicating whether a cell of the corresponding class exists or not.

On the other hand, the addresses A7, A8 and A9 are stored in a class-1 storage area CL1 in order of addresses a1 to a3 (addresses of the storage area CL1).

Since read operation needs to be carried out in order of addresses a3, a2 and a1 (i.e., in order of cells C3, C7 and C9), the addresses A are stored with addresses a to be read next affixed thereto.

For example, the address A9 is stored at the address a3 with the address a2 affixed thereto, the address a2 being the address where the address A8 to be read next is stored.

Thus, an address chain is created for the class concerned and is managed by a register R2.

In the register R2 shown in FIG. 8, the address a3 is set as START (read start address) and the address a1 is set as END (read end address). EMPTY is flag information indicating whether a cell of the corresponding class exists or not.

The aforementioned read operation is performed by a scheduler Sc in the read control means 13 by successively reading the addresses A stored in the read address management memory 130, from START in the register R in accordance with the address chain.

Figure 9:
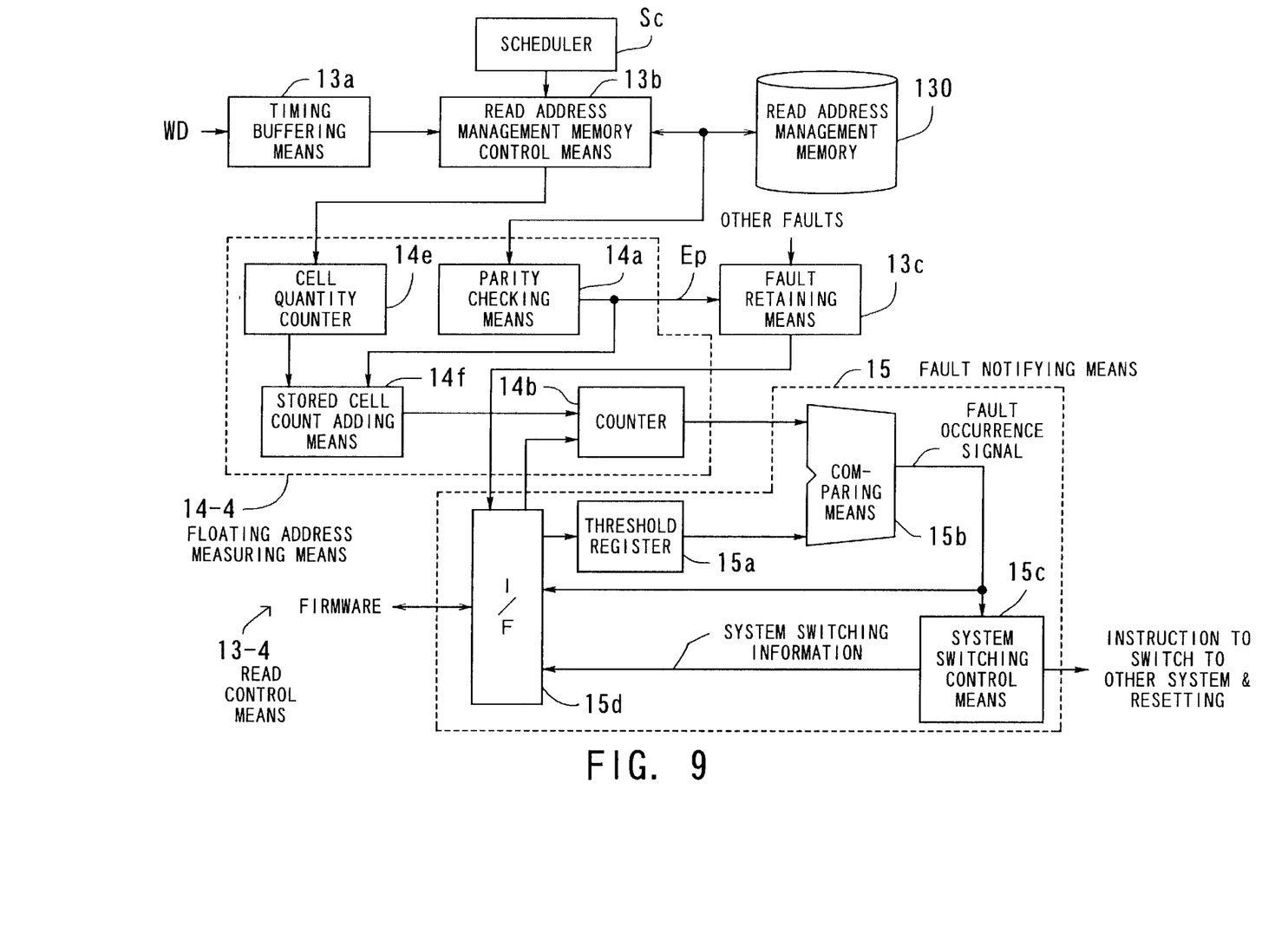
FIG. 9 is a diagram showing the arrangement of an ATM switching device according to a first embodiment.

An ATM switching device 1a according to a first embodiment will be now described wherein the floating address measuring means 14 and the fault notifying means 15 are included in the read control means 13.

FIG. 9 illustrates the arrangement of the ATM switching device 1a according to the first embodiment. In the figure, an interface section between the cell buffer 11a and read control means 13-4 is omitted.

In the first embodiment, the read address management memory control means 13b detects a floating address based on data transmitted thereto from the read address management memory 130 (information on the addresses a explained above with reference to FIG. 8).

Also, the read address management memory control means 13b counts, as floating addresses, the number of addresses of cells already stored in the cell buffer 11a.

The timing buffering means 13a receives the write address information WD which is timed to the clock on the side of the write control means 12, and outputs the information in a manner timed to the clock on the side of the read control means 13-4.

The read address management memory control means 13b acquires, from the write address information WD, the contents of address information of the cell buffer 11a in which corresponding cells have been written, and stores the address information (information on the addresses A explained above with reference to FIG. 8) in the read address management memory 130 (provided externally to the read control means 13-4).

When the cells are read from the cell buffer 11a, the address information is fetched from the read address management memory 130 in accordance with the address chain as instructed by the scheduler Sc.

Floating address measuring means 14-4 comprises parity checking means 14a, a counter 14b, a cell quantity counter 14e and stored cell count adding means 14f.

The parity checking means 14a checks parity of the address information read from the read address management memory 130. The result of parity check is sent to the fault retaining means 13c and the stored cell count adding means 14f.

The cell quantity counter 14e measures the quantity of cells in the cell buffer 11a. Specifically, based on the write address information WD, the counter 14e counts up the quantity of cells written into the cell buffer 11a.

Also, based on the address information read out by the read address management memory control means 13b from the read address management memory 130, the counter 14e counts down the quantity of cells read from the cell buffer 11a.

If, for example, 500 cells are written at first into the cell buffer 11a, the cell quantity counter 14e counts up from "500" in accordance with the write address information WD.

If 200 cells are thereafter read from the cell buffer 11a, the cell quantity counter 14e decrements "200" from the cell quantity.

Consequently, the cell quantity counter 14e shows a value of "300", which is the number of cells currently stored in the cell buffer 11a.

The stored cell count adding means 14f retains the count of the cell quantity counter 14e, and on receiving the parity error signal Ep, it reckons all the count then retained as floating addresses.

Namely, if parity error occurs (address chain becomes disconnected) in the middle of read operation according to the address chain, then the succeeding part of the address chain cannot be followed, and therefore, not only the addresses already read out but addresses not read out yet are counted as floating addresses. The stored cell count adding means 14f sends the number of addresses thus counted to the counter 14b.

For example, on receiving the parity error signal Ep while retaining the count "300", the stored cell count adding means 14f notifies the counter 14b of the 300 addresses at a time.

The counter 14b counts the value output from the stored cell count adding means 14f as floating addresses. The operations of the other components are identical with those described above, and therefore, description thereof is omitted.

As described above, in the ATM switching device 1a according to the present invention, when an address chain becomes disconnected, the number of addresses of cells then stored is counted as floating addresses.

This permits the occurrence of floating address to be detected with accuracy and also permits a counter-fault process to be performed immediately.

Although in the ATM switching device 1a of the first embodiment the cell quantity counter 14e and the stored cell count adding means 14f are provided for the measurement of floating addresses, the arrangement of the address fault monitoring device 1 described in the foregoing embodiments may be applied to the ATM switching device 1a.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An address fault monitoring device for monitoring faults associated with occurrence of floating addresses which are unusable addresses, comprising:

data storing means for storing data transmitted thereto;

write control means for controlling writing of the data with respect to said data storing means and notifying a read control side of write address information including information on a write address;

read control means for controlling reading of the data with respect to said data storing means and notifying said write control means of read address information including information on a read address;

floating address measuring means for counting the number of the floating addresses by means of hardware, said floating address measuring means reckoning the write address or the read address as the floating address if transmission error occurs during transmission of the write address information or the read address information; and fault notifying means for monitoring the counted number of the floating addresses to determine whether or not the counted number is greater than a preset threshold, and making notification of fault if the counted number has become greater than or equal to the preset threshold.

2. The address fault monitoring device according to claim 1, wherein said floating address measuring means counts the number of the floating addresses based on an error correction code exchanged between said write control means and said read control means.

3. The address fault monitoring device according to claim 1, further comprising system switching control means for performing switching of systems and then initializing said data storing means when the number of the floating addresses has become greater than or equal to the threshold.

4. The address fault monitoring device according to claim 1, wherein said floating address measuring means counts all addresses within one frame as the floating addresses if transmission error has occurred in a frame pulse during transmission of the write address information or the read address information.

5. The address fault monitoring device according to claim 1, wherein said floating address measuring means counts all addresses within one frame as the floating addresses if abnormality in frame period has occurred during transmission of the write address information or the read address information.

6. The address fault monitoring device according to claim 1, wherein said floating address measuring means counts the number of the floating addresses based on one of data transmitted thereto from a write address management memory managed by said write control means and data transmitted thereto from a read address management memory managed by said read control means.

7. The address fault monitoring device according to claim 1, wherein said floating address measuring means counts, as the floating addresses, the number of addresses of data already stored in said data storing means when the floating address is detected based on data transmitted thereto from a read address management memory managed by said read control means.

8. The address fault monitoring device according to claim 1, wherein said floating address measuring means and said fault notifying means are included in at least one of said write control means and said read control means.

9. An ATM switching device for performing cell routing-switching process, comprising:

a cell buffer for storing a cell transmitted thereto;

write control means for controlling writing of the cell with respect to said cell buffer and notifying a read control side of write address information including information on a write address;

read control means for controlling reading of the cell with respect to said cell buffer and notifying said write control means of read address information including information on a read address;

floating address measuring means for counting the number of floating addresses, which are unusable addresses, by means of hardware, said floating address measuring means reckoning the write address or the read address as the floating address if transmission error occurs during transmission of the write address information or the read address information; and fault notifying means for monitoring the counted number of the floating addresses to determine whether or not the counted number is greater than a preset threshold, and making notification of fault if the counted number has become greater than or equal to the preset threshold.

10. The ATM switching device according to claim 9, wherein said floating address measuring means counts, as the floating addresses, the number of addresses of cells already stored in said cell buffer when the floating address is detected based on data transmitted thereto from a read address management memory managed by said read control means.

* * * * *